June 30, 1936. K. E. SUMMERS 2,046,097
WHEEL DRESSING DEVICE FOR ABRASIVE LAPPING MACHINES
Filed Sept. 27, 1935
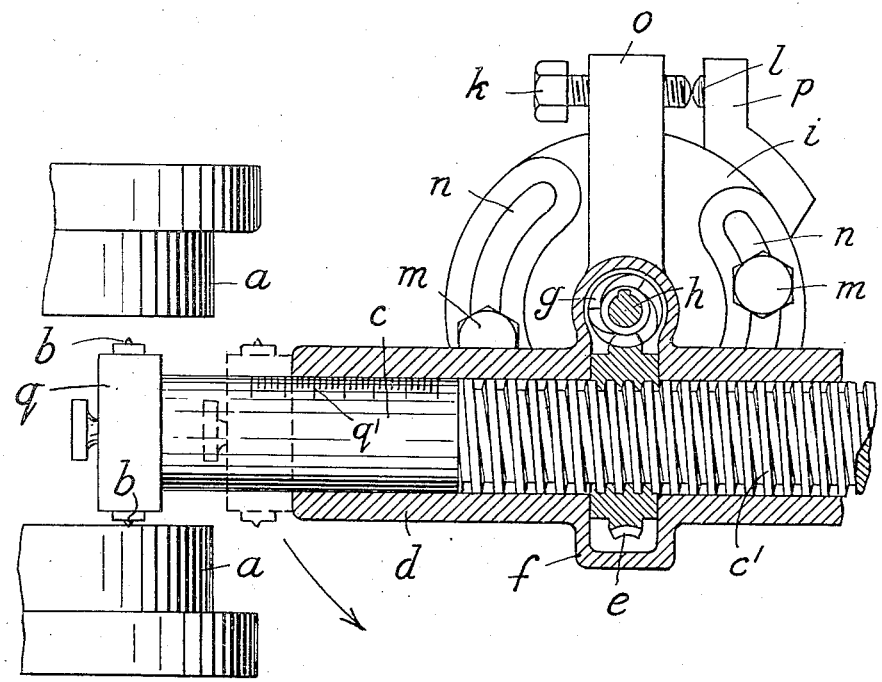
Inventor:
Kenneth Edward Summers Patented June 30, 1936

2,046,097

UNITED STATES PATENT OFFICE 2,046,097

WHEEL DRESSING DEVICE FOR ABRASIVE LAPPING MACHINES

Kenneth Edward Summers, Old Fletton, England

Application September 27, 1935, Serial No. 42,396
In Great Britain May 8, 1934

4 Claims. (Cl. 125—11)

This invention relates to an abrasive lapping machine of the kind provided with bonded abrasive wheels and with a dressing or truing tool for said wheels adapted to be operated from the main shaft of the machine, and the invention consists essentially in the provision of a tool carrier for the truing or dressing tool comprising a screw spindle which is axially displaceable and controlled by a worm gear the worm wheel of which is constructed as a nut and mounted on the spindle.

The invention is illustrated in the accompanying drawing which represents a sectional view of the essential parts of the machine.

The lapping machine comprises a pair of abrasive wheels $a$ between which the work is introduced for lapping in known manner.

The dressing or truing of the wheels is effected by means of diamonds or other cutting tools $b$ which are adjustably fitted in a carrier comprising a screw spindle $c$ and a dressing head $q$ secured to one end of the spindle. For moving the cutting tool across the lapping faces of the wheels, the spindle $c$ is axially and non-rotatably guided in a sleeve $d$ and controlled by a worm gear the worm wheel $e$ of which is constructed as a nut and mounted on the screw threaded portion $c^1$ of the spindle. The sleeve $d$ is formed with a casing $f$ wherein the worm wheel is guided and prevented from axial displacement, and the rotation of the wheel will therefore cause the spindle $c$ to move axially within the sleeve. The worm $g$, which is also enclosed in the casing $f$, is mounted on a shaft $h$ which receives motion from the main shaft of the machine through the the medium of a clutch and a pair of friction driven bevel gears. The clutch is used for throwing the dressing device into and out of operation.

The sleeve $d$ is connected to a disc $i$ by means of which it is mounted on a support $n$ so that it can be angularly adjusted about the shaft $h$. This arrangement allows the tools, after they have been withdrawn by means of the nut $e$ from between the abrasive wheels, as indicated by dotted lines, to be turned out of operative position. The operative position is determined by means of adjustable stops comprising an adjusting screw $k$ fitted in an arm $o$ on the disc $i$ and a rigid abutment $l$ for said screw fitted in a bracket $p$ on the support $n$. Screws $m$ are provided for securing the disc to the support $n$ in adjusted position.

The adjustable stops are particularly useful when the lapping faces, instead of being horizontal, are to be dressed with a definite slope. The axial displacement of the spindle may, for determining the diameters of the lapping faces, be made with reference to a scale $q'$ applied as illustrated or in any other manner.

When the friction drive is disengaged, the device may, if desired, be hand-operated.

I claim:

1. In an abrasive lapping machine of the character described, the combination with a pair of spaced, coaxial lapping wheels, of a dressing device for said wheels comprising a screw spindle, a dressing head connected to one end of said spindle, a nut in the form of a worm wheel mounted on said spindle, a sleeve forming an axial guide for the spindle, a casing formed on said sleeve wherein the worm wheel is laterally supported, a worm shaft passing through said casing at right angles to the spindle, a worm on said shaft meshing with the worm wheel, a disc connected to the sleeve and adjustable together with the latter about the worm shaft, a support for said disc allowing it to be turned for bringing the spindle into and out of alignment with the space between the lapping wheels, and means for securing the disc to the support in different angular positions.

2. The structure claimed in claim 1 in combination with an adjustable stop for regulating the operative position of the spindle.

3. The structure claimed in claim 1 in combination with an arm on the disc, a bracket on the support facing said arm, and an adjusting screw in one of said latter elements co-operating with the other element for regulating the operative position of the screw spindle.

4. A structure as claimed in claim 1 wherein the axial displacement of the spindle relative to the sleeve is regulated by means of a graduated scale.

KENNETH EDWARD SUMMERS.